UNITED STATES PATENT OFFICE.

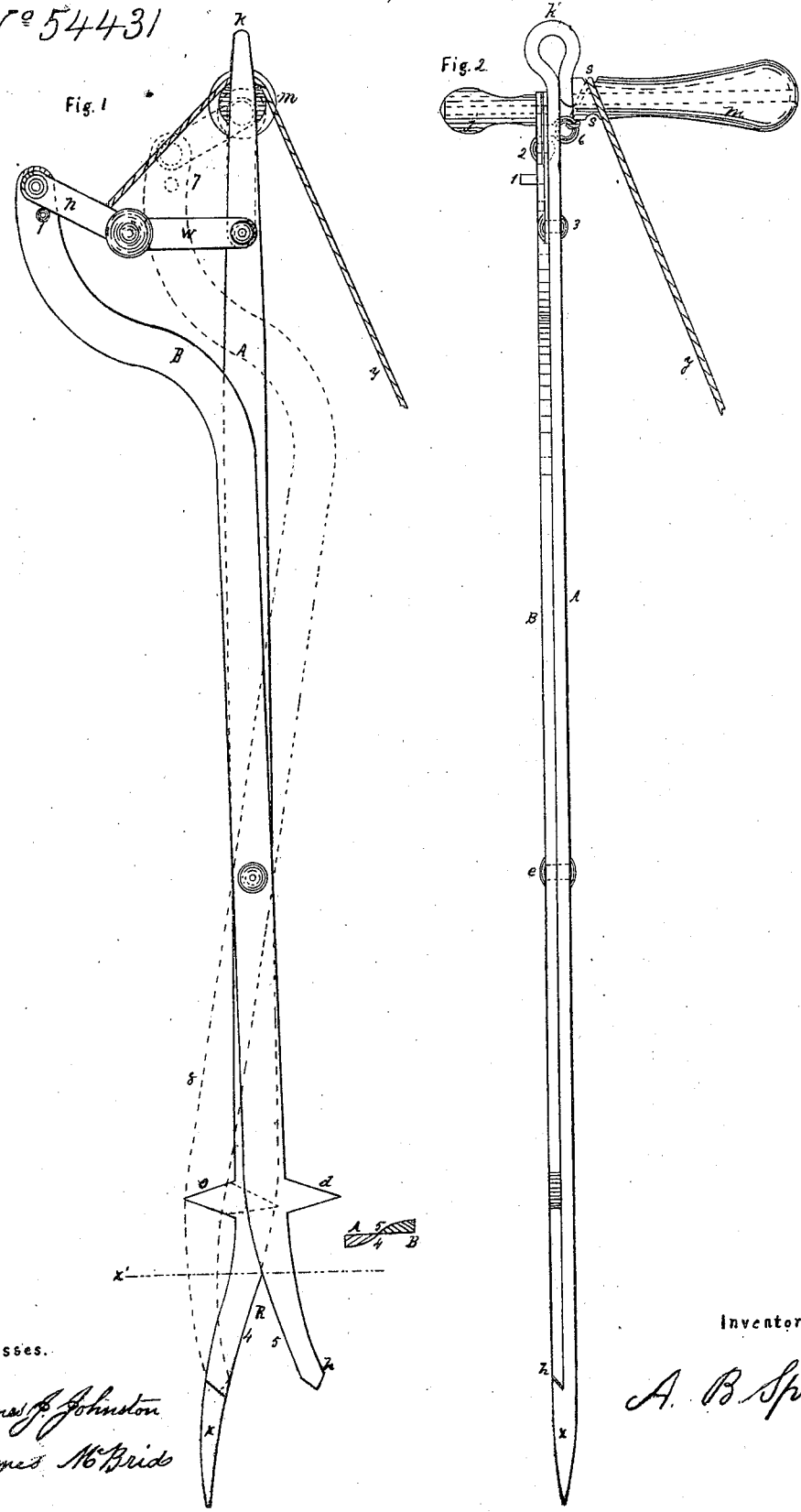

ARIEL B. SPROUT, OF HUGHESVILLE, PENNSYLVANIA.

IMPROVEMENT IN HORSE HAY-FORKS.

Specification forming part of Letters Patent No. 54,431, dated May 1, 1866.

*To all whom it may concern:*

Be it known that I, ARIEL B. SPROUT, of Hughesville, in the county of Lycoming and State of Pennsylvania, have invented a new and useful Improvement in Hay-Elevator and Shears Combined in one Machine; and I do hereby declare that the following is a full and exact description thereof, reference being had to the accompanying drawings, and to the letters of reference marked thereon.

My invention consists in combining in one machine a hay-elevator and hay-shears, so that said machine can be used for hoisting hay into the mow or onto the wagon or stack, or for cutting the hay down in the stack or mow, and then used for removing it from the stack or mow, said hay elevator and shears being constructed, arranged, and operating in the manner hereinafter described.

To enable others skilled in the art to make and use my invention, I will proceed to describe its construction and operation.

In the accompanying drawings, Figure 1 represents a front elevation of my improved hay-elevator and shears. Fig. 2 represents a side elevation of the same. Fig. 3 represents a transverse section of the shears and hay-elevator below the barbs and cut through at line $x'$.

In the drawings, A and B represent two rods or flat bars of iron or steel, or iron and steel combined. Said rods or bars are furnished with barbs or prongs, (marked $d$ and $o$.) Said rods or bars and their barbs or prongs are made substantially in the form represented in the drawings. The part below the line marked $x'$ has the edges 4 and 5 made sharp, as shown in Fig. 3. The rods or bars A and B are hinged together at the point marked $e$ by means of suitable bolt or rivet, and the upper end of bar A is furnished with a handle marked $m$, also with a loop marked $k$, for the rope used for hoisting. To the upper end of the bar B is attached, at 2, a lever marked $n$, and near the upper end of bar A, at 3, is attached a lever marked $w$. These two levers are hinged together by the rod in the handle $j$. To the eye marked 6 is attached a cord, $y$, which passes up and over the handle $m$, and in the groove marked $s$ in the handle. The point $x$ of the rod or bar A is furnished with a groove or offset for the point $h$ of the bar or rod B, so that the point $h$ will not catch in entering the hay. The barbs $d$ and $o$ should have their edges made sharp, so that they will cut their way in entering the hay.

The operation of my improvement is as follows: Having all things constructed, arranged, and combined as herein described and represented, I close the rods or bars A and B together, as indicated by the dotted lines 7 and 8. I then force them, when thus closed, down into the hay by pressing on the handle $m$. I then press on the handle $j$, which will cause the levers $n$ and $w$ to spread the bars A and B, as shown in Fig. 1, until the lever $n$ comes in contact with the stop marked 1. I then hoist the elevator and its load of hay to the place desired, and then I unship it by drawing on cord $y$, which will bring bar B into the position represented by the dotted lines 7 and 8. The cutting is performed by arranging the parts as represented in Fig. 1, and then forcing the bars A and B, when thus spread, into the hay, and the hay which comes in the angle R is cut by the edges 4 and 5. After the desired quantity is cut the cut hay is removed by operating with the elevator in the manner described.

I claim—

Constructing and arranging the bars A and B in such manner that they may be used either for elevating hay or as hay-shears, substantially as herein described.

A. B. SPROUT.

Witnesses:
JAMES J. JOHNSTON,
A. C. JOHNSTON.